United States Patent [19]

Ericson

[11] Patent Number: 4,535,807

[45] Date of Patent: Aug. 20, 1985

[54] AUTOMATIC AIR VALVE DEVICE FOR DUCTS

[76] Inventor: Kurt S. B. Ericson, Prins Boudewijnlaan, 48, B-2230 Schilde, Belgium

[21] Appl. No.: 553,762

[22] Filed: Nov. 21, 1983

[30] Foreign Application Priority Data

Nov. 19, 1982 [BE] Belgium .................. 0/209.518

[51] Int. Cl.³ .................. F16K 15/08; F16K 17/12
[52] U.S. Cl. .................. 137/533.31; 137/533.29; 137/526
[58] Field of Search .......... 137/526, 533.17, 533.19, 137/533.21, 533.29, 533.31, 543.19

[56] References Cited

U.S. PATENT DOCUMENTS

| | | | |
|---|---|---|---|
| 711,304 | 10/1902 | George | 137/533.17 |
| 1,578,766 | 3/1926 | Schwemlein | 137/526 |
| 3,092,139 | 6/1963 | Rodgers et al. | 137/533.29 |
| 3,210,056 | 10/1965 | Sant | 137/533.17 |
| 3,513,875 | 5/1970 | Nelson | 137/533.19 |
| 3,862,281 | 1/1975 | Uchiyama | 137/533.17 |
| 4,224,044 | 9/1980 | King | 137/526 |
| 4,232,706 | 11/1980 | Ericson | 137/526 |
| 4,436,107 | 3/1984 | Persson | 137/526 |

FOREIGN PATENT DOCUMENTS

| | | | |
|---|---|---|---|
| 2635412 | 2/1978 | Fed. Rep. of Germany | 137/533.19 |
| 2073857 | 10/1981 | United Kingdom | 137/533.29 |

Primary Examiner—Alan Cohan
Assistant Examiner—John A. Rivell
Attorney, Agent, or Firm—Balogh, Osann, Kramer, Dvorak, Genova & Traub

[57] ABSTRACT

The device includes a tubular body, an annular flap cooperating with the tubular body, and a cover cooperating with the tubular body to form a channel or peripheral air inlet beneath the annular flap, which channel is closed by the latter. When a partial vacuum occurs in the conduit connected to the device, the annular flap is raised by the incoming ambient air upwardly and into the internal space defined by the inner periphery of the cover. The annular flap is provided with external guiding lugs oriented downwardly and which cooperate with ribs integrally formed on the outside of the tubular body.

5 Claims, 4 Drawing Figures

AUTOMATIC AIR VALVE DEVICE FOR DUCTS

The present invention relates to an automatic air valve device for a conduit through which a fluid such as air, water, etc. passes, capable of being subjected to a partial vacuum and comprising a tubular body as well as an annular flap which is raised by the ambient or atmospheric air when a partial vacuum occurs in the conduit with formation of a chamber or a space above the flap.

Generally speaking, in known devices, the flap which lifts when external air enters is guided with the aid of means which are provided inside the body of the valve and, generally, in the space formed above the flap, thus limiting the travel of the flap and also causing a restriction in the amount of air which is introduced when the flap is raised.

Furthermore, these guiding means risk being subjected to the influence of polluted air or water.

The present invention aims to overcome these drawbacks and consists essentially in that the annular flap is provided with guiding means which are oriented downwards and cooperate with other means provided on the outside of the tubular body.

In the practical embodiment of the invention, the flap has guiding lugs provided with an internal groove which cooperates with ribs moulded onto the outside of the valve body.

The invention will be described below with the aid of the attached drawings, as regards the following applications:

A. A device for sanitary ducts for removing waste water.

Figure 1:
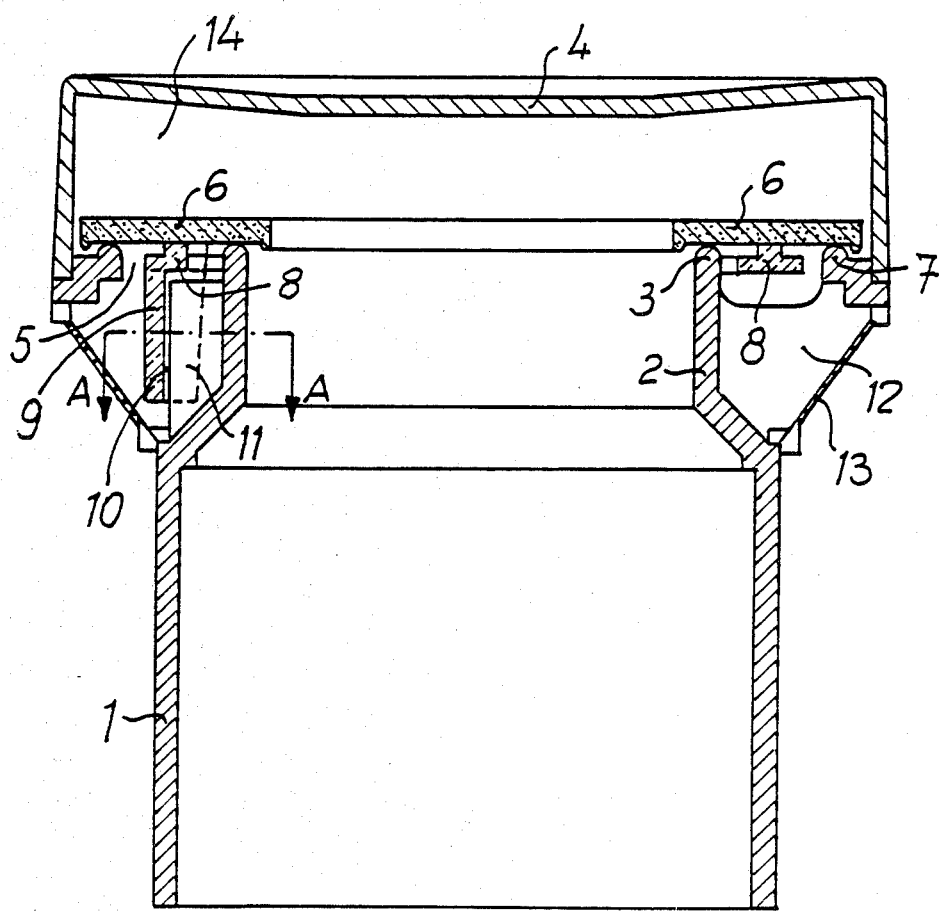
FIG. 1 is a view of the device, in vertical section.

In FIG. 1 of the attached drawings, 1 denotes the valve body which is connected to an air duct (not shown) and which, in the example shown, comprises at its upper end a frustoconical neck 2 which has the shape of a Venturi tube, ends in a lip 3 and cooperates with a cover 4 so as to give rise to a peripheral air inlet 5 by forming a channel which can be closed by a membrane or an annular flap 6; the latter, situated on the outside of the frustoconical neck, rests on an internal seat formed by the lip 3 and on an external seat formed by a lip 7 provided on the internal periphery of the cover 4.

The annular flap 6 is provided with an annular support 8 made, for example, of a plastic material.

Figure 2:
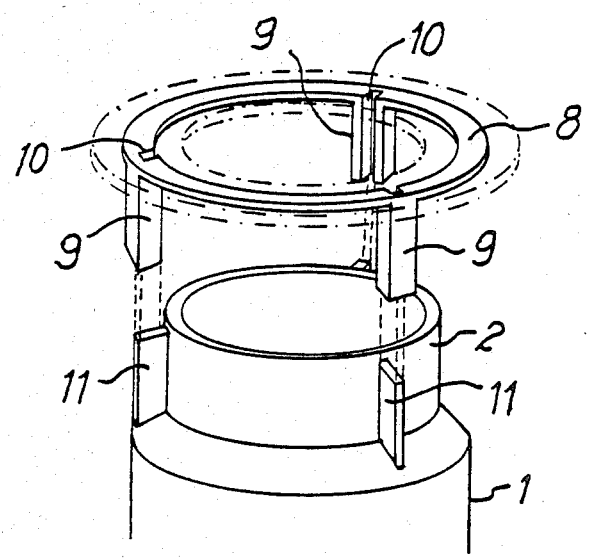
FIG. 2 is a perspective view which shows the new guiding device provided according to the invention.

In accordance with the invention, this support has guiding lugs 9 which are oriented downwards and provided with an internal groove 10 which cooperates with ribs 11 moulded onto the outside of the valve body 1 (FIG. 2).

Cross-pieces 12 are provided, which connect the external seat 7 to the body 1 of the valve.

An additional feature is that a grill 13 is provided at the entrance to the annular channel in order to protect the annular flap 6 against the introduction of foreign bodies and, in particular, insects.

It can be easily understood that, as a result of the invention, the annular flap is able to move along a path which corresponds to the entire height of the internal space 14 of the cover or the chamber formed in the space above the annular flap and defined by the inner periphery of the cover, thus allowing considerably more air to be introduced than in known devices. Thus, this dimensional relationship between the annular flap and the chamber constitutes a novel feature of the present invention.

Furthermore, since the guides for the flap 6 are provided on the outside of the body 1 of the valve, protection is ensured against the damaging effects of moisture, vapour and splashes occurring inside the body of the valve.

Figure 3:
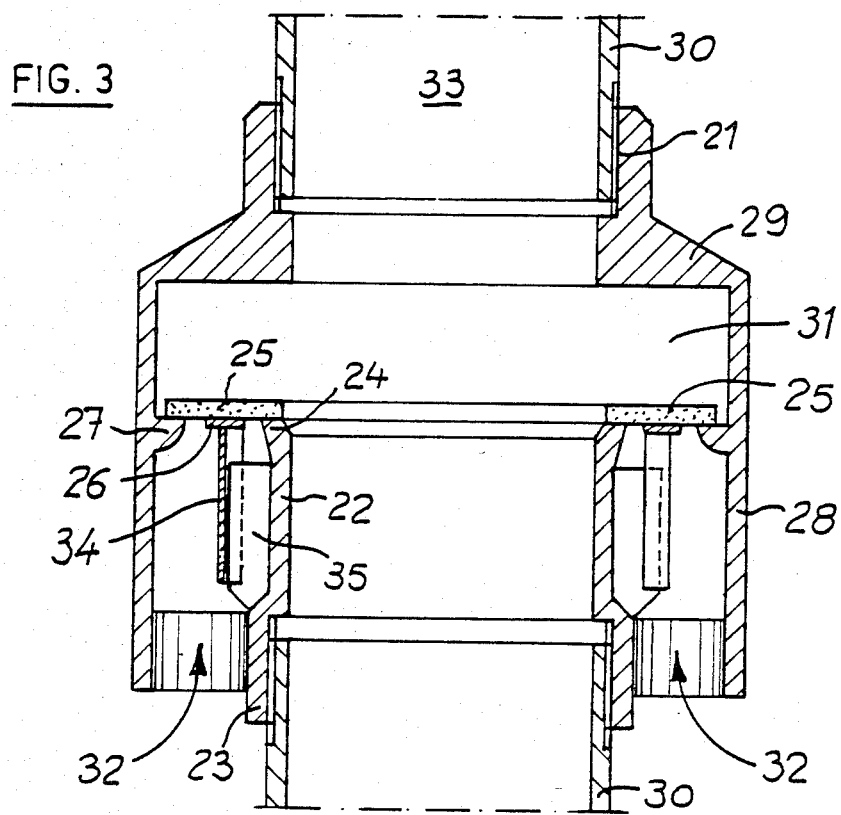
FIG. 3 is a device for water ducts, capable of being subjected to a partial vacuum.

In the embodiment according to FIG. 3, the device is applied to a water conduit 33, and the device shown in this Figure is provided between two connecting flanges 21, 23 which link it to the pipe 30 of this conduit. The body 22 of the valve is integral with the connecting flange 23 and forms with its upper edge a seat 24 for an annular flap 25 provided with a support 26 which is also annular and resting in turn on a seat 27 formed by an external sleeve 28 integral with a cap 29 comprising the connecting flange 21, thereby giving rise to the formation of a chamber 31 above the annular flap 25 and defined by the inner periphery of cap 29.

An air inlet 32 is formed between the sleeve 28 and the tubular body 22.

When, for example, following an interruption in the water supply, a partial vacuum occurs in the duct 33 thus formed, the flap 25 is raised as a result of the partial vacuum and the ambient or atmospheric air enters the chamber 31 and the conduit 33 so as to eliminate this partial vacuum.

This partial vacuum in the main conduit can lead to contaminated water from a sanitary appliance being sucked into this conduit.

Figure 1A:
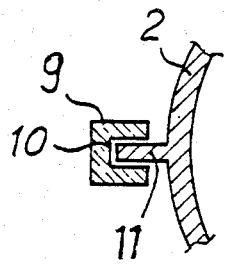
FIG. 1A is a section along the line A—A shown in FIG. 1.

According to the invention, the support 26 of the flap 25 has guiding lugs 34 which are oriented downwards and, as is the case in FIGS. 1, 1A and 2, are provided with an internal groove which cooperates with ribs 35 moulded onto the outside of the tubular body 22.

I claim:

1. In an automatic air valve device for a conduit used for passing fluids and capable of being subjected to a partial vacuum, said device being of the type comprising a tubular body, a cover cooperating with the tubular body to form a channel or peripheral air inlet therebetween, an annular flap cooperating with the valve body and said cover and disposed above said channel or peripheral air inlet so as to close the same, and a chamber formed in the space above said annular flap and defined by the inner periphery of said cover so that, when a partial vacuum occurs in the conduit, said annular flap is raised by ambient air upwardly into the chamber, the improvement which comprises said annular flap provided with an annular support having guiding lugs oriented downardly and the tubular body having integrally formed ribs disposed on the outer periphery thereof, said guiding lugs being provided with a U-shaped internal groove which cooperates with said integrally formed ribs.

2. An improved device according to claim 1, wherein said annular flap and the chamber have a dimensional relationship such that, when a partial vacuum occurs, said annular flap is raised upwardly by ambient air to move along a path which corresponds to the entire height of the chamber.

3. An improved device according to claim 1, further comprising a grill provided at the entrance of the channel or peripheral air inlet so as to protect against the introduction of foreign bodies.

4. An improved device according to claim 1, for use with sanitary ducts for removing waste water, intended to allow the entry of fresh air into the ducts when a partial vacuum occurs, and in which said annular flap is situated on the outside of the valve body.

5. An improved device according to claim 1, further comprising the valve body forming with its upper edge a first seat for said annular flap and said cover provided with an external sleeve forming a second seat for said annular flap.

* * * * *